(12) United States Patent
Rits (10) Patent No.: US 7,975,137 B2
(45) Date of Patent: Jul. 5, 2011

(54) METHOD AND SYSTEM FOR SECURELY EXTENDING A PATH OF A MOBILE AGENT WITHIN A NETWORK SYSTEM

(75) Inventor: Maarten Rits, Nice (FR)

(73) Assignee: SAP AG, Walldorf (DE)

( * ) Notice: Subject to any disclaimer, the term of this patent is extended or adjusted under 35 U.S.C. 154(b) by 779 days.

(21) Appl. No.: 12/016,475

(22) Filed: Jan. 18, 2008

(65) Prior Publication Data
US 2008/0201762 A1    Aug. 21, 2008

(30) Foreign Application Priority Data

Jan. 19, 2007    (EP) .................................... 07290073

(51) Int. Cl.
| | |
|---|---|
| *H04L 29/06* | (2006.01) |
| *H04L 9/32* | (2006.01) |
| *G06F 11/30* | (2006.01) |
| *G06F 12/14* | (2006.01) |
| *G06F 7/04* | (2006.01) |
| *G06F 15/16* | (2006.01) |
| *G06F 17/30* | (2006.01) |
| *G06F 3/00* | (2006.01) |
| *G06F 9/44* | (2006.01) |
| *G06F 9/46* | (2006.01) |
| *G06F 13/00* | (2006.01) |

(52) U.S. Cl. ........ 713/153; 713/187; 713/162; 713/170; 726/3; 709/202; 719/317

(58) Field of Classification Search .................. 713/153, 713/187
See application file for complete search history.

(56) References Cited

U.S. PATENT DOCUMENTS

| | | | | |
|---|---|---|---|---|
| 6,055,562 | A  * | 4/2000 | Devarakonda et al. | ........ 709/202 |
| 6,233,601 | B1 * | 5/2001 | Walsh | ........................... 709/202 |
| 6,330,588 | B1 * | 12/2001 | Freeman | ....................... 709/202 |
| 6,466,963 | B1 * | 10/2002 | Shigemori | ..................... 709/202 |
| 7,213,021 | B2 * | 5/2007 | Taguchi et al. | ........................ 1/1 |
| 7,213,047 | B2 * | 5/2007 | Yeager et al. | .................. 709/202 |

(Continued)

FOREIGN PATENT DOCUMENTS

EP    1780653 A1 *  5/2007

(Continued)

OTHER PUBLICATIONS

Borselius, N., Mobile agent security, Oct. 2002, Electronics and Communication Engineering Journal, pp. 211-218.*

(Continued)

*Primary Examiner* — Christopher A Revak
*Assistant Examiner* — Carolyn B Kosowski
(74) *Attorney, Agent, or Firm* — Brake Hughes Bellermann LLP (57) ABSTRACT

A method, a system, and a computer program product for access control using resource filters for a strict separation of application and security logic are described. The computer-implemented method for access control may include receiving at least one access request to at least one resource from an application; providing a resource hierarchy for the at least one resource, the resource having at least one resource class, wherein the resource hierarchy is defined in a single resource; providing a policy comprising at least one access control rule for accessing at least one element of the at least one resource class; verifying the at least one access request based on the policy through an authorization service; and processing the at least one access request through a service interface.

26 Claims, 2 Drawing Sheets

U.S. PATENT DOCUMENTS

| | | | |
|---|---|---|---|
| 7,257,843 B2 * | 8/2007 | Fujita et al. | 726/27 |
| 7,269,845 B1 * | 9/2007 | Rygaard et al. | 726/3 |
| 7,328,243 B2 * | 2/2008 | Yeager et al. | 709/205 |
| 7,383,433 B2 * | 6/2008 | Yeager et al. | 713/157 |
| 7,430,761 B2 * | 9/2008 | Fujita et al. | 726/27 |
| 7,567,562 B2 * | 7/2009 | Lee et al. | 370/389 |
| 7,711,117 B1 * | 5/2010 | Rohrle et al. | 380/270 |
| 7,743,089 B2 * | 6/2010 | Putzolu | 709/202 |
| 2003/0135541 A1 * | 7/2003 | Maeda et al. | 709/202 |
| 2004/0088347 A1 * | 5/2004 | Yeager et al. | 709/202 |
| 2004/0133640 A1 * | 7/2004 | Yeager et al. | 709/204 |
| 2008/0201762 A1 * | 8/2008 | Rits | 726/1 |
| 2008/0253571 A1 * | 10/2008 | Rits | 380/277 |

FOREIGN PATENT DOCUMENTS

| | | | |
|---|---|---|---|
| EP | 1860816 A1 * | 11/2007 | |
| EP | 1860817 A1 * | 11/2007 | |
| EP | 1879136 A1 * | 1/2008 | |
| EP | 1879323 A1 * | 1/2008 | |

OTHER PUBLICATIONS

Jansen, W.A., Countermeasures for mobile agent security, 2000, Computer Communications, vol. 23, pp. 1667-1676.*

Ordille, Joann J., When agents roam, who can you trust?, 1996, IEEE, pp. 188-191.*

Intent to Grant for EP Application No. 07290073.1, mailed Sep. 10, 2008, 4 pages.

Extended EP Search Report for EP Application No. 07290073.1, mailed Aug. 21, 2007, 6 pages.

Office Action for EP Application No. 07290073.1, mailed Jul. 10, 2008, 1 page.

Office Action Response for EP Application No. 07290073.1, filed Jul. 31, 2008, 3 pages.

Karnik, et al, "Security in the Ajanta Mobile Agent System", Department of COmputer Science, University of Minnesota, May 17, 1999, 28 pages.

Green, et al, "Software Agents: A Review", Trinity College Dublin, May 27, 1997, 51 pages.

Hohl, "Time Limited Blackbox Security: Protecting Mobile Agents from Malicious Hosts", LNCS, vol. 1419, 1998, 7 pages.

Yee, "Using Secure Coprocessors", School of Computer Science, Carnegie Mellon University, CMU-CS-94-149, May 1994, 104 pages.

Wilhelm, et al, "Introducing Trusted Third Parties to the Mobile Agent Paradigm", Secure Internet Programming: Security Issues for Mobile and Distributed Objects, 1999, 21 pages.

Sander, et al, "Towards Mobile Cryptography", International Computer Science Institute, TR-97-049, Nov. 22, 1997, 16 pages.

* cited by examiner

METHOD AND SYSTEM FOR SECURELY EXTENDING A PATH OF A MOBILE AGENT WITHIN A NETWORK SYSTEM

CROSS-REFERENCE TO RELATED APPLICATION

This application claims priority under 35 U.S.C. §119 to European Patent Application EP 07 290 073.1, filed Jan. 19, 2007, entitled "Method and system for securely extending a path of a mobile agent within a network system," which is incorporated herein by reference in its entirety.

TECHNICAL FIELD

This description relates to the field of mobile agent technology, particularly to mobile agent security in network systems when extending a path of such a mobile agent.

BACKGROUND

In computer science, a mobile agent is a composition of computer software and data, which is able to migrate from one server to another autonomously and continue its execution on a destination server. A mobile agent inherits some of the characteristics of an agent. An agent is a computational entity that acts on behalf of other entities in an autonomous fashion, performs its actions with some level of proactivity and/or reactiveness and exhibits some level of key attributes of learning, co-operation and mobility. A mobile agent, namely, is a type of a software agent, with the feature of autonomy, social ability, learning, and most important, mobility. When the term mobile agent is used, it refers generally to a process that can transport its state from one environment to another, with its data intact, and still being able to perform appropriately in the new environment. The mobile agent environment is, generally speaking, a software system that is distributed over a network system of heterogeneous servers. Its primary task is to provide an environment in which mobile agents can execute. The mobile agent environment is built on top of a host system. Mobile agents travel between mobile agent environments. They can communicate with each other either locally or remotely. Finally, communication can also take place between a mobile agent and a host service. Mobile agents are active in that they may choose to migrate between servers at any time during the execution. This makes them a powerful tool for implementing distributed applications in a network system. During their route through the network system, mobile agents can carry data with them. These data can be data that are necessary for their execution on a certain server and results from calculations that have been performed on a certain server. The route of a mobile agent can be defined in advance, or the mobile agent can adapt its route on its way based on certain events. After the completion of their tasks, most mobile agents return to their departure point to return the results they gathered.

There are quite a lot of advantages of using mobile agents, which are described in the following. Mobile agents reduce network traffic. Some applications first download a large amount of data from a server and then process this data to a smaller amount, e.g., search and filter applications, such as, for example, data-mining. If one would use mobile agents for these programs, then these mobile agents would be able to execute the work on the server itself, without congesting the network system because only the results of the calculation would be sent back.

Furthermore, by means of mobile agents, an asynchronous and autonomous execution on multiple heterogeneous network servers is possible. Some applications need a large amount of client-server interactions which can be done through classic client-server method invocations or with web services used in a so-called Enterprise Services Architecture (ESA). Also in this case mobile agents can be more efficient. A mobile agent can work asynchronously and autonomously while the system that sent the mobile agent is no longer connected to the network system. Mobile servers like laptops and PDAs, that mostly have an uncertain and expensive connection with relative low bandwidth, can therefore make proper use of mobile agents.

Moreover, mobile agents have the possibility to adopt themselves to changes in their execution environment. This is why mobile agents can be used, for example, in load-balancing. When a server is starting to become overloaded, some processes can be placed to another server within the network system in the form of a mobile agent, where they can continue their execution. Also, other application scenarios exist where intelligent agents can make efficient decisions based on the changing execution environment. An e-business scenario with mobile agents would allow, for example, finding the cheapest price for an airplane ticket, car rental and hotel booking. Most airlines have deals with car rental companies and hotels. This information would be available when the mobile agent will visit the server of the airline company. The mobile agent would collect the prices of the airplane ticket and then continues its route to the service of cooperating car rental companies and hotels.

As already mentioned, the use of mobile agents is tolerant to network faults. Mobile agents are able to operate without an active connection between a client and a server.

Common applications of mobile agents include, for example, resource availability, discovery, monitoring, information retrieval, network management and dynamic software deployment.

If one wants to execute a mobile agent on a server, then this mobile agent comes under the complete control of the server. If a server has malicious intentions and wants to change the mobile agent or simply delete the mobile agent, this is impossible to prevent. However, it can be attempted to make targeted, malicious changes impossible by applying detection mechanisms. With cryptographic techniques one can try to make sure that the server cannot read information that is not targeted towards it. The fact that the mobile agent travels from one server to another means, however, that classic methods are not sufficient anymore to protect these mobile agents.

There are some existing methods to protect mobile agents against servers. Generally, there are two categories of existing methods to protect mobile agents against servers, namely so-called Blackbox methods and Partial Protection methods.

The goal of Blackbox methods is to hide the whole program code of a mobile agent for a server, so that the intention of the mobile agent is not clear and the server will not be able to make targeted modifications. There are basically three different approaches in this category.

A first approach can be called "Tamper-free Hardware." One can use here a special manufactured tool as an execution environment for the mobile agents. The internal specifications of the system are physically separated from the outside world and impossible to maintain without damaging the tool, which can be easily verified. This approach gives a very good protection. However, it is practically unacceptable on a large scale because of the high manufacturing costs. For more information reference is made to "U. G. Wilhelm, S. Staamann, L. Buttyan. Introducing Trusted Third Parties to the Mobile Agent Paradigm. In J. Vitek and C. Jensen, Secure Internet Programming: Security Issues for Mobile and Distributed Objects, volume 1603, pages 471-491. Springer-Verlag, New York, N.Y., USA, 1999" and "Bennet Yee. Using Secure Coprocessors. PhD Thesis, May 1994."

A further approach can be called "Obfuscated Code." This approach tries to rearrange the code of the mobile agent in such a way that it becomes incomprehensible, but still has the same effect. The technique is closely related to obfuscation techniques to prevent reverse engineering. At this moment there is no method that makes the code incomprehensible infinitely in time. If one has enough processing capacity, one can rediscover the meaning of the code. A less strict variant of this approach is the time limited protection, i.e., the obfuscated code is only valid for a certain period in time, after which the mobile agent becomes invalid. A large problem here is that one has not yet defined ways to calculate the effectiveness of the obfuscation algorithms. In other words, it is not possible to calculate an underlimit for the time. More information can be found in "Fritz Hohl, Time Limited Blackbox Security: Protecting Mobile Agents from Malicious Hosts. In Giovanni Vigna, Mobile Agent Security, pages 92-113. Springer-Verlag. 1998."

A further approach refers to Mobile Cryptography. Suppose one has an algorithm to calculate a function f and one wants to know from a certain input value x the function value f(x) on a server without the server knowing f. This would be possible if one could encrypt f in a way that E[f(x)], the function value of x calculated with the encrypted function, could be decrypted back to f(x). This technique is very promising, but the biggest challenge remains to develop encryption schemas E for arbitrary functions f. For now E exists only for certain classes of polynomials and rational functions as it is described in reference "T. Sander and C. Tschudin. Towards Mobile Cryptography. In Proceedings of the IEEE Symposium on Security and Privacy, Oakland, Calif., 1998."

Instead of covering the whole mobile agent for the servers in the approach of partial protection, part of the mobile agent will be protected, like confidential information that the mobile agent carries with him. In this case, however, the servers can perform targeted attacks against the mobile agents, which was not possible with blackbox methods. The mobile agents are vulnerable to so-called cut-and-paste attacks. One can remove data from a mobile agent and use another mobile agent to get to know the confidential information.

The purpose of an existing method described in the following and further described in reference "Neeran M. Karnik and Anand R. Tripathi. Security in the Ajanta mobile agent system. Software, Practice and Experience, 31(4): 301-329, 2001," is to make data that the mobile agent carries with him only accessible to certain servers. It is assumed in the following that the servers within the network system are all provided with a pair of a public key and a private key, respectively. One could try to make data that a mobile agent carries with it only accessible to certain servers by encrypting those data with the respective public keys of the servers. To check the integrity and the authenticity of the data one can then also calculate a digital signature on the whole. This can be described by the following mathematical term:

$$[\{m_1\}KS_1, \ldots, \{m_n\}KS_n]PKS_0 \quad (1)$$

where $m_i$ is a message for a server $S_i$, $KS_i$ is the public key of server $S_i$, and $PKS_0$ is the private key of the owner of the respective mobile agent, namely server $S_0$.

When a mobile agent arrives on a certain server, this server verifies first the signature on the whole data structure with the public key of the agent owner. After this step, the server checks if the mobile agent carries messages that are destined for that server. If this is the case, the respective server can decrypt these messages with its private key and makes them available to the mobile agent, if appropriate.

This described method makes use of classic cryptographic techniques to protect the data of the mobile agent. However, because the mobile agents migrate from one server to another before returning to their home server, the mobile agents need additional protection. This will become clear from the description of the following approach.

To clarify the attack described in the following, the assumption is made that the mobile agent only carries one message. The server owning the mobile agent as well as each server within the network system is associated with a pair of a public key and a private key, respectively. Suppose that a server A wants to send a secret message to a server B via a network system. Server A encrypts this secret message with the public key of server B. Then server A sends a mobile agent on its way through the network system to the respective server B. For simplicity it is assumed in the following that the mobile agent only consists of its program code PA and its container containing the message. It is assumed further that the mobile agent first arrives on a server of user E on its way to server B. This scenario can be described as follows:

$$A => E: PA, [\{mB\}KB]PKA \quad (2)$$

where PA is the program code of the mobile agent; mB is the secret message for server B; KB is the public key of server B; and PKA is the private key of server A as the owner of the mobile agent.

Server E can in this situation just remove the private key as the signature of server A, put the encrypted message mB in its own agent and sign the whole data container with its own private key PKE. Then server E can send the mobile agent to server B, which can be described as follows:

$$E => B: PE, [\{mB\}KB]PKE, B: PE, [\{mB\}KB]$$
$$PKE => \{\{mB\}KB\}PKB = mB \quad (3)$$

where PE describes the program code of the mobile agent owned by server E, and PKE describes the signature, namely the private key of server E as the owner of the new mobile agent.

Server B decrypts the message mB unaware of server E's intents and makes it available to the actual mobile agent. If server E programs its mobile agent's code PE in a way that it keeps track of the message mB, then server E has full access to this secret message mB when the mobile agent returns back to server E, which can be described as follows:

$$B => E: PE, [\{mB\}KB]PKE, mB \quad (4)$$

The purpose of another existing method described in the following and further described in the reference "Green, S., Somers, F., Hurst, L., Evans, R., Nangle, B., Cunningham, P.; Software agent: A review, May (1997)" is to add data that an agent finds on a server to a secure data container. It is assumed in the following, as already mentioned, that the servers within the network system are all provided with a pair of a public key and a private key, respectively. Also the server from which the mobile agent is sent out, in the following called the first server, has a public key and a private key. Before sending a mobile agent on its route through the network system a nonce $N_o$ is first encrypted with the public key of the first server, namely the server from which the mobile agent will be sent out. Within the scope of the present specification the term first server, agent owner and the server from which the mobile agent is sent out are used synonymously. The encrypted nonce $N_o$ is kept secret and thus only known by the first server and can be written as follows:

$$C_o = \{N_o\} KS_0 \quad (5)$$

where $N_o$ is the mentioned nonce; $KS_0$ is the public key of the first server; and $C_o$ is the encrypted nonce.

When the mobile agent wants to take data $X_i$ with it from a certain server $S_i$, the mobile agent asks the respective server $S_i$ to sign the data $X_i$ with its private key. Thus, a new checksum is being calculated, which can be described by the following mathematical term:

$$C_i = \{C_{i-1}, [X_i]PKS_i, S_i\} KS_0 \quad (6)$$

where $C_i$ describes the $i^{th}$ checksum; $C_{i-1}$ describes the $(i-1)^{th}$ checksum; $X_i$ describes the data the mobile agent wants to take with it from the server $S_i$; $PKS_i$ is the private key of server $S_i$; $S_i$ is a server code of the server $S_i$; and $KS_0$ is the public key of the first server from which the mobile agent is sent out.

The mobile agent carries now the data which it takes from different servers on its route through the network system and the actual checksum that is calculated successively on the different servers. The data may be kept in a data container. The data the mobile agent takes with it remain visible to the other servers. If one wants to prevent this one can encrypt the data with the public key of the first server. When the mobile agent returns home, i.e., to the first server, it can be checked by the first server if the mobile agent has been modified on its route through the network system. To do this one proceeds in the other direction by deflating the checksum and verifying the signature on the data, which can be described by the following mathematical term:

$$\{C_i\} PKS_0 = C_{i-1}, [X_i]PKS_i, S_i \quad (7)$$

where $C_i$ is the $i^{th}$ checksum; $PKS_0$ is the private key of the first server; $C_{i-1}$ is the $(i-1)^{th}$ checksum; $X_i$ is the data the mobile agent has gathered from the server $S_i$; $PKS_i$ is the private key of server $S_i$; and $S_i$ is a server code of server $S_i$ itself.

When at a certain point a verification of the signature fails the data that has been checked so far can be regarded as trustable, but the data further contained in the remaining checksum cannot be trusted anymore. When finally the whole checksum has been successfully deflated, one should get the nonce $N_o$ so that it is certain that the data container is part of the mobile agent and it is not the data container of another mobile agent.

This described method also makes use of classic cryptographic techniques to protect a data transfer of a mobile agent. However, since the mobile agents migrate from one server to another before returning to their home server, the mobile agents need additional protection. This will become clear from the description of the following attack.

It is assumed in the following that a first server $S_0$ sends out a mobile agent that is intended to reach a specific server B. On its way through the network the mobile agent from server $S_0$ arrives at an intermediary server E. It is supposed that server E gets the mobile agent from server $S_0$ and that server E knows an old value of a checksum $C_i$ of a sequence of checksums $C_1$ to $C_n$ where i is smaller that n. This is possible for example if there is a loop in the route of the mobile agent on its way through the network system or if server E collaborates with another server where the mobile agent already went on its route through the network. Server E can now just starting from the $i^{th}$ element, leave elements out of the data container, change or add elements in the name of other servers. To do this server E makes its own mobile agent that carries a message $X_{i+1}$ with it that server E wants to add at the $(i+1)^{th}$ position and its own data container. Server E sends its own mobile agent with program code PE together with the checksum $C_i$ to server B which can be described as follows:

$$E \Rightarrow B: PE, X_{i+1}, C_i \quad (8)$$

The mobile agent of server E asks server B to sign the data with its private key and to calculate a new checksum $C_{i+1}$ and to give it back to the mobile agent which then returns back to server E which can be described as follows:

$$B \Rightarrow E: PE, C_{i+1} = \{C_i, [X_{i+1}]PKB, B\} KE \quad (9)$$

where PE is the program code of the mobile agent of server E; PKB is the private key of server B; KE is the public key of server E; $C_{i+1}$ and $C_i$ are the respective checksums; and $X_{i+1}$ are the data server E wants to add at the $(i+1)^{th}$ position.

That means that server E sends its mobile agent to server B in order to let server B add the message $X_{i+1}$ to the data container. When the mobile agent gets back home to server E, server E decrypts the checksum with its private key and encrypts it again with the public key from server $S_0$. Server E can in this way continue until it is satisfied with the result. Then it can release the mobile agent from server $S_0$ with the forged data container and send it back to server $S_0$ which can be described as follows:

$$E \Rightarrow S_0: PS_0, C_{i+1} = \{C_i, [X_{i+1}]PKB, B\} KS_0 \quad (10)$$

where $PS_0$ is a program code of the mobile agent from server $S_0$; $KS_0$ is the public key of server $S_0$ and $C_{i+1}$; and $C_i$ are the respective checksums. Server $S_0$ has no possibility to detect the malicious behavior of server E.

In the following, two methods are rudimentary described wherein each method meets one of the above-mentioned problems, respectively.

In order to make sure that one can check if the data the agent is carrying with it are really this agent's data and do not belong to another agent, a method as proposed in a previous European patent application with the application number 06 290 878.5 can be provided, the method comprising at least the following steps:

choosing a unique number and assigning it to the mobile agent, choosing a secret symmetric key and assigning it to the data to be protected, encoding the secret key with the second server's public key, encrypting the secret key and the first server's public key via a wrapping function, thus forming a data authentication code, encoding the data with the secret key, and combining the unique number, the encoded data, the encoded secret key and the data authentication code and encoding that combination with the first server's private key, thus forming a nested structure to be decoded successively for access to the data.

According to a possible embodiment of the method, the nested structure to be decoded for access to the data is defined as follows:

$$[PA, r0, \{SKo\}KB, h(KA, SKo), \{mB\}SKo]PKA \quad (11)$$

where PA is an agent's program code, r0 is the unique number; SKo is the secret key; KB is the second server's public key; h is the wrapping function, such as a hash function; KA is the first server's public key; PKA is the first server's private key; and mB is the data to be protected.

Coming back to the exemplary attack mentioned before, the same scenario can be described and the attack as described before can be avoided by means of the method according to a possible implementation as follows:

When the mobile agent arrives at a server of user B, user B verifies first the private key associated with the mobile agent, representing at the same time a signature from a user A as the owner of the mobile agent on the whole data structure which has been received by the server of user B. Then user B decrypts the secret symmetric key, called here SKo, with its private key, called here PKB. Then user B checks the message authentication code, that means the hash function value h of the public key KA from user A, namely the public key associated with the mobile agent, and the secret symmetric key SKo. Finally, user B decrypts the message mB and makes it available to the mobile agent, if appropriate.

The attack described before is not possible anymore since user E does not know the secret symmetric key SKo and cannot forge the hash value h(KA, SKo). User E can remove again the signature of user A, namely the private key PKA associated with the mobile agent and can replace it by its own private key PKE. Furthermore, user E can replace the mobile agent code of user A by the mobile agent code of its own agent represented by PE. Therefore, user E can send to user B the following:

$$E => B: [PE, r0, \{SKo\}KB, h(KA, SKo), \{mB\}SKo]\,PKE \quad (12)$$

Since the public key KA does not match with the private key PKE of user E with which user E signed the data structure, the verification of the hash function value h(KA, SKo) by user B will fail and user B will not decrypt the message mB and thus does not make it available to the mobile agent of user E.

According to a further possible embodiment of the method, the unique number is used only once and is calculated on basis of a program code of the mobile agent. Therefore, the data structure contains a unique number, in the above mentioned case called r0 that will be used only once and that is calculated on the basis of the program code of the mobile agent, represented in the above mentioned case by PA. Every time a user sends out a new mobile agent the user changes that unique number. This number is introduced because if not, it could be possible that an old mobile agent of a specific user can be reused. If user A, for example, sends out a mobile agent to change data about him that are kept at user B, then someone would be able to reuse an old mobile agent of user A to change the data back into the old data.

It is possible that user B maintains a list of numbers that have already been used. Therefore, user B has a control that no number can be reused, and therefore, an already used agent cannot be reused again.

According to a further possible embodiment of the method, the program code of the agent is maintained in a Java Archive file. Furthermore, it is possible that that Java Archive file is signed by the private key associated with the mobile agent which is the private key of the mobile agent's owner.

It is also possible that the Java Archive file contains the unique number assigned to the mobile agent.

The complete structure to be decoded can be defined as follows:

$$[PA, r0]PKA+[r0, \{SKo\}KB, h(KA, SKo), \{mB\}SKo]\,PKA \quad (13)$$

where PA is an agent's program code; r0 is the unique number; SKo is the secret symmetric key; KB is the second server's public key; h is the wrapping function; KA is the first server's public key; PKA is the first server's private key; and mB is the data to be protected. The reason why the Java Archive file may also contain the unique number is because the agent's program code and the value of the objects, i.e., the data of the mobile agent, can be serialized separately in existing agent platforms.

In order to meet the second problem, namely to add data that a mobile agent from a first server finds on a $i^{th}$ server of a number of servers the mobile agent has to pass according to an appropriate succession to a secure data container, a method can be applied as proposed in another previous European patent application with the application number 06 290 876.9, the method comprising the following steps:

receiving the mobile agent which has been prepared by the first server by choosing a unique number and assigning it to the mobile agent, encoding the chosen unique number with the private key of the first server, thus forming an agent specific initialization number as basis for a sequence of checksums to be computed successively by the number of servers, and sending the mobile agent together with its initialization number on its route through the network system for processing the order passing thereby the number of servers successively, encoding in case that the mobile agent intends to take data with it when passing the $i^{th}$ server the initialization number together with the data with the $i^{th}$ server's private key and computing therewith a new server specific checksum using the public key of the first server and the checksum computed by the server right before in the succession, and sending the mobile agent further to the next server within the succession.

According to a possible embodiment of the method the data the mobile agent takes with it from servers on its route through the network is encoded by the public key of the first server. Thereby, it can be avoided that the data remains visible to other servers when the mobile agent is on its route through the network system.

Furthermore, it is possible that the sequence of checksums is defined by the following functional rule:

$$C_i = \{C_{i-1}, [X_i, [r0]PKS_0]PKS_i, S_i\}KS_0 \quad (14)$$

where $C_i$ is the $i^{th}$ checksum; $X_i$ is the data from the $i^{th}$ server; r0 is the unique number; $PKS_0$ is the private key of the first server; $KS_0$ is the public key of the first server; $PKS_i$ is the private key of the $i^{th}$ server; $S_i$ is a code number of the $i^{th}$ server; i is a positive integer value.

It is assumed that the mobile agent has to pass for processing its order a succession of n servers $S_1, \ldots, S_n$, wherein n is a positive integer value. In the functional rule described above, i should be smaller or equal to n. r0 is the unique number which has not to remain secret. $[r0]PKS_0$ corresponds to a signature from the first server from which the mobile agent is sent out.

Coming back to the exemplary attack mentioned before, the same scenario can be described and the attack as described before can be avoided by means of an implementation as follows:

When a mobile agent wants to take data with it from a certain server $S_i$, the new checksum $C_i$ is, as already described, the following:

$$C_i = \{C_{i-1}, [X_i, [r0]PKS_0]PKS_i, S_i\}KS_0 \quad (15)$$

It is clear that the previously described attack is not possible anymore. It is supposed again that server E gets the mobile agent from the first server $S_0$ and that server E knows an old value of the checksum $C_i$ with i<n. This is possible, as already indicated before, if there is, for example, a loop in the route of the mobile agent or if server E collaborates with another server where the mobile agent already went. If server E uses the checksum $C_i$ and the unique number from server $S_0$ in its own mobile agent, then the unique number r0 gets signed with the private key of server E which is described by [r0]PKE. Server B which is asked by the mobile agent from server E to compute a new checksum by adding the data $X_{i+1}$ will determine the checksum as follows:

$$C_{i+1} = \{C_i, [X_{i+1}, [r0]PKE]PKB, B\}KE \quad (16)$$

In the originally proposed method the data container was initialized with $\{N_0\}KS_0$ to be able to check in the end if the data container truly belonged to this respective mobile agent and to prevent a server of generating its own data container. This mechanism was flawed. By using the new computational rule for computing the checksum this can be avoided. When server E receives the checksum it replaces its public key KE by the public key $KS_0$ of the first server. Since the signature from server E, namely [r0]PKE is further signed by the private key PKB of server B when computing the new checksum $C_{i+1}$, and further server E does not know the private key of the first server, server E is not able to erase its private key PKE from the checksum, thus leaving a kind of fingerprint. Therefore, when server E sends the mobile agent from server $S_0$ together with the falsified data and the new checksum $C_{i+1}$ back to server $S_0$, server $S_0$ will immediately recognize that the data container is not part of its own mobile agent, but the data container of another agent. Finally, server $S_0$ can be sure that the data it gets by its own mobile agent have been tampered by any server on the mobile agent's route through the network.

It is possible that the unique number, r0, which does not have to remain secret, corresponds to a process identification number. That means that the chosen unit number can be at the same time associated to a specific order or process, which the mobile agent has to execute on its route through the network. It is also possible that each checksum is deflated for verifying successively the respective keys on the data thus checking the unaffected and correct processing of the order.

Apart from such provisions in order to prevent the above mentioned kinds of attacks, it may further be necessary to provide a mechanism that guarantees that a certain number of previously defined servers are being visited by the mobile agent on its route through a corresponding network system. Therefore, it would be appropriate to protect the path of a mobile agent.

Thereby, the following mechanism to protect the path of the mobile agent can be considered. Before the mobile agent is sent out from the first server $S_A$, the path of the mobile agent is encrypted in the following way:

where $ip(S_i)$ is the ip-address of server $S_i$, t is a unique number and "End" denotes the end of the path of the mobile agent.

Thus, the path contains the encrypted addresses of the servers that the mobile agent will visit and digital signatures to protect the integrity of the path. The path is encrypted in a nested format.

When the mobile agent arrives at server $S_i$, server $S_i$ decrypts the internet addresses of its predecessor $ip(S_{i-1})$ and of its successor $ip(S_{i+1})$, the digital signature and the rest of the encrypted path that now becomes the new data structure of the route.

The digital signatures are calculated based on a unique number t, this is necessary to prevent replay attacks. They also contain the ip-addresses of the current server $S_i$, of the previous server $S_{i-1}$ and the next server $S_{i+1}$. The rest of the path is also signed.

Based on "End" the server $S_n$ can decide if it is the endpoint of the path. Thus, "End" is a configuration value. Mostly, the mobile agent will return to the first server where the mobile agent departed. The digital signatures are included in the encrypted part, to keep the path secret.

By encrypting the path in a nested format, the following attack can be prevented. Thereby, it is assumed that the original path of the mobile agent contains two servers $S_i$ and $S_j$, that are not located the one immediately after the other (j>i+1). Then the server $S_i$ can send a copy of the path to $S_j$ when the mobile agent is located on the server $S_i$. The server $S_j$ can check so far if it is in the path of the mobile agent by trying to decrypt with his private key in a sequential way the data of the path. If in one of the attempts it is capable of obtaining the clear text, then server $S_j$ knows that it is in the path. In this case server $S_j$ informs server $S_i$ about this, and server $S_i$ can then send the mobile agent immediately to server $S_j$, whereby the servers between $S_i$ and $S_j$ are not visited by the mobile agent. No server after $S_j$ can detect this kind of attack.

By using the nested format as described before, this kind of attack is not possible anymore, because the path is calculated one step at a time. Because of the nested encryption of the path the servers have to be visited in the right order. In each step the address of the following server is decrypted and the remaining information of the path is still encrypted with the public key of the next server. If the verification of the signature by server $S_i$ is successful, $S_i$ can be certain that it was included in the original path, that the mobile agent comes from the correct predecessor, that the address of the following server $S_{i+1}$ is correct and that all further data in the path cannot be changed.

$$r = \{ip(S_A), ip(S_2), [ip(S_A), ip(S_1), ip(S_2), t, \{\ldots\}KS_2]PKS_A\}KS_1 \quad (17)$$

$$\{\ldots\}KS_2 = \{ip(S_1), ip(S_3), [ip(S_1), ip(S_2), ip(S_3), t, \{\ldots\}KS_3]PKS_A\}KS_2$$

...

...

$$\{\ldots\}KS_{n-1} = \{ip(S_{n-2}), ip(S_n), [ip(S_{n-2}), ip(S_{n-1}), ip(S_n), t, \{\ldots\}KS_n]PKS_A\}KS_{n-1}$$

$$\{\ldots\}KS_n = \{ip(S_{n-1}), End, [ip(S_{n-1}), ip(S_n), End, t, \{\ldots\}KS_3]PKS_A\}KS_n$$

An attack that cannot be prevented by this scheme is the following. A server $S_i$ can send information about a mobile agent, for example its identity, to all servers that are cooperating with that server $S_i$. If the mobile agent later on, by coincidence, arrives at one of these servers, then the mobile agent can be reset to its old state when it still was at server $S_i$ and bypassed all the servers in between, as described before. Server $S_i$ has to save a copy of the mobile agent, however, in order to reuse it later on.

A previous European patent application with application number 06 291 145.8 provides a method for protecting data and path of a mobile agent from a first server within a network system with a plurality of servers. At least a number of those servers are passed by the mobile agent according to an appropriate succession which defines a path of the mobile agent. The path and data intended for any one of the servers are jointly encrypted within a nested structure, the nested structure being built up on a number of nested terms corresponding to the number of servers, each nested term being decryptable in the given succession by exactly one server of the number of servers in such a manner that each server of the number of servers gets access only to the data intended for it and to a section of the path enclosing it, respectively.

The principle of the path protection is described by formula (17).

Because of the nested structure of the path the servers have to be visited in the right order, namely in the right chronology. If the verification of the signature by $S_i$ is successful, $S_i$ can be certain that it was included in the original path, that the mobile agent comes from the correct predecessor, that the address of the following server is correct and that all further data in the path cannot be changed. In order to protect the data of the mobile agent it is possible to add those data of the nested path scheme to the other data that are targeted to the different servers on the path. A suitable data protection mechanism is already described in the already mentioned previous application with the application number 06 290 878. This can be described, for example, by the following mathematical term:

$$\text{Data}\_S_i = [r0, ip(S_{i-1}), ip(S_i), \{S_iKo\}KS_i, h(KS_0, S_iKo), \{m'_i\}S_iKo]PKS_0 \quad (18)$$

where r0 is a unique number; $S_iKo$ is the respective server's secret key; $KS_i$ is the respective server's public key; h is the wrapping function; $KS_0$ is the first server's public key; $PKS_0$ is the first server's private key and $m'_i$ is the $i^{th}$ term of the nested terms which is defined as follows:

$$m'_i = m_i, ip(S_{i+1}), \text{Data}\_S_{i+1} \quad (19)$$

where i is a positive integer value, $m_i$ is the data intended for the $i^{th}$ server $S_i$. $m'_i$ comprises the data of the nested path scheme.

The data of the nested path scheme is added hereby to the other data that are targeted to the different servers on the path. The unique number, t, which has already been introduced before, corresponds generally to the unique number r0.

Thus, the mechanism to protect the data of the mobile agent becomes now a nested data structure.

Furthermore, it is also possible to use a mechanism already introduced before to add data to the mobile agent in a secure way. Every time a mobile agent reaches a server, the server has to add at least his identity to a secure data container even if no other data are collected at that server. This way one can check when the mobile agent is back home if the mobile agent has completed his full path. The mechanism which can be used to add data to the mobile agent in the secure way can be described by the following functional rule:

$$C_i = \{C_{i-1}, [X_i, [r0]PKS_0]PKS_i, S_i\}KS_0 \quad (20)$$

where $C_i$ is the $i^{th}$ checksum; $X_i$ is the data to be added at the $i^{th}$ server; r0 is the unique number; $PKS_0$ is the private key of the first server; $KS_0$ is the public key of the first server; $PKS_i$ is the private key of the $i^{th}$ server; $S_i$ is a code number of the $i^{th}$ server; and i is a positive integer value.

However, it is not possible to check whether the agent has completed a part of the path on the route. No server on the path can see the full path that the mobile agent should follow. This is in most cases quite convenient with respect to privacy of information.

However, it would be convenient if the initial path of the mobile agent could be extended on the route. One of the main advantages of using mobile agents is that they can roam the internet autonomously in order to retrieve information. By specifying an initial path to follow, this feature of mobile agents would be severally restricted, therefore it is important to provide a mechanism to securely extend the initial path based on conditions in the execution environment.

SUMMARY

Therefore, it would be appropriate to provide a method to securely extend an initial path of a mobile agent from a first server within a network system.

According to one aspect, a method is provided for securely extending a path of a mobile agent from a first server within a network system with a plurality of servers, where the mobile agent has to pass at least an initial number of the servers according to a pre-given chronology that defines an initial path of the mobile agent. At least one of the initial number of servers, referred to herein as the initiator server, when being reached by the mobile agent in the pre-given chronology can extend the initial path of the mobile agent by a second number of servers of a plurality of servers including the server following the initiator server according to the initial path. Thereby, an extension of the initial path can be defined which can be a loop from the initiator server to the server following the initiator server according to the initial path, wherein the extended path and data intended for any one of the second number of servers can be jointly encrypted within a nested structure which is given to the mobile agent to take with it. The nested structure can be built up of a number of nested terms corresponding to the second number of servers, each nested term being decryptable by exactly one server of the second number of servers in such a manner that each server of the second number of servers gets access only to the data intended for it and to a section of the path when being reached by the mobile agent in the defined chronology of the extension of the initial path.

The nested structure can further include a signature of the initiator server of the extension of the initial path.

According to a further aspect, the initial path and data intended for any one of the initial number of servers can be jointly encrypted within an initial nested structure, the initial nested structure being built up of a number of nested terms corresponding of the initial number of servers, each nested term being decryptable by exactly one server of the initial number of servers in such a manner such that each server of the initial number of servers gets access only to the data intended for it and to a section of the path, respectively, when being reached by the mobile agent in the chronology defined by the initial path.

It is possible that the nested term of the initial nested structure that is decryptable by the server following the initiator server according to the initial path is integrated in the nested structure which describes the extension of the initial path. In case that the initiator server is server $S_i$ and the second number of servers which are to be passed by the mobile agent on the extension of the initial path are servers $S_{1'}, \ldots S_{n'}$ and the last server of the second number of servers is $S_{i+1}$, the encrypted path extension can be described by the following formula:

(21)

$$r' = \{ip(S_i),ip(S_{2'}),[ip(S_i),ip(S_{1'}),ip(S_{2'}),t,\{\ldots\}KS_{2'},r]PKS_i\}KS_{1'},r$$

$$\{\ldots\}KS_{2'} = \{ip(S_{1'}),ip(S_{3'}),[ip(S_{1'}),ip(S_{2'}),ip(S_{3'}),t,\{\ldots\}KS_{3'},r]PKS_i\}KS_{2'}$$

...

...

$$\{\ldots\}KS_{n-1'} = \{ip(S_{n-2'}),ip(S_{n'}),[ip(S_{n-2'}),ip(S_{n-1'}),ip(S_{n'}),t,\{\ldots\}KS_{n'},r]PKS_i\}KS_{n-1'}$$

$$\{\ldots\}KS_{n'} = \{ip(S_{n-1'}), ip(S_{i+1}),[ip(S_{n-1'}),ip(S_{n'}), ip(S_{i+1}),t, \{\ldots\}KS_{i+1},r] PKS_i\}KS_{n'}$$

$$\{\ldots\}KS_{i+1} = \{ip(S_{n'}),End,[ip(S_{n'}),ip(S_{i+1}),End,t,r]PKS_i\}KS_{i+1}$$

where $r=\{ip(S_i), ip(S_{i+2}), [ip(S_i), ip(S_{i+1}), ip(S_{i+2}),t, \{\ldots\}KS_{i+2}]PKS_0\}KS_{i+1}$.

The signatures can be calculated the on basis of the extension and the initial path. The initial path can be included in order to detect immediately if someone maliciously modified the initial path. Moreover, servers in the path extension can, on their turn, again extend the path and so on, until full freedom and mobility is achieved by the mobile agent.

The formula described above describes the situation when a server $S_i$ wants to extend the initial path by making a new targeted data structure where server $S_i$ puts the next server in the initial path, namely server $S_{i+1}$, as the last server in the extension of the initial path. When server $S_{i+1}$ receives a mobile agent, the ip-address of the server from which server $S_{i+1}$ receives the mobile agent, namely from server $S_{n'}$, does not match the ip-address of the server denoted in the initial path, namely $S_i$. But because $S_i$ signed the path extension, server $S_{i+1}$ knows that the path has been extended by server $S_i$.

In order to protect the data of the mobile agent it is possible to add those data of the nested path scheme to the other data that are targeted to the different servers on the path. A suitable data protection mechanism is already described in the already mentioned previous application with the application number EP 06 290 878. This can be described, for example, by the following mathematical term:

$$Data\_S_i = [r0, ip(S_{i-1}), ip(S_i), \{S_iKo\}KS_i, h(KS_I, S_iKo), \{m'_i\}S_iKo]PKS_I \quad (18)$$

where r0 is a unique number; $S_iKo$ is the respective server's secret key; $KS_i$ is the respective server's public key; h is the wrapping function; $KS_I$ is the public key of a signing server; $PKS_I$ is the private key of the signing server; and $m'_i$ is the $i^{th}$ term of the nested terms which is defined as follows:

$$m'_i = m_i, ip(S_{i+1}), Data\_S_{i+1} \quad (19)$$

where i is a positive integer value; $m_i$ is the data intended for the $i^{th}$ server $S_i$; where the signing server is the initiator server with respect to the extension of the initial path and the first server with respect to the initial path.

The data of the nested path scheme can be added hereby to the other data that are targeted to the different servers on the path. The unique number t that has already been introduced before, corresponds generally to the unique number r0.

Thus, the mechanism to protect the data of the mobile agent becomes a nested data structure.

According to a further aspect, the unique number can be used only once and can be calculated on the basis of a program code of the mobile agent.

It is also possible that the program code of the mobile agent is maintained in a Java Archive file.

The Java Archive file can be signed by the first server's private key.

Furthermore, the Java Archive file can contain the unique number assigned to the mobile agent.

Moreover, the agent's program code and the data of the agent can be serialized separately.

In another aspect, the unique number can be used by the servers for registration in a list of numbers, thus keeping a check on the numbers that have already been used.

In another implementation the method can further include, starting from the initiator server, at least the following steps:
    receiving the mobile agent which has been prepared by the first server by choosing a unique number and assigning it to the mobile agent, encoding the chosen unique number with the private key of the first server, thus forming an agent specific initialization number as basis for a sequence of checksums to be computed successively by the number of servers, and sending the mobile agent together with its initialization number on its route through the network system passing thereby the number of servers successively,
    encoding the initialization number together with data to be added by the initiator server and which comprise at least all identities of the servers on the extension of the initial path with the initiator server's private key and computing therewith a new server specific checksum using the public key of the first server and the checksum computed by the server right before in the succession, and sending the mobile agent further on the extension of the initial path passing thereby the second number of servers successively, so that each server of the second number of servers when being passed by the mobile agent encodes the initialization number together with data which are to be added at the respective server and which comprise at least the identity of that respective server with that server's private key and computes therewith a new server specific checksum using the public key of the first server and the checksum computed by the server right before in the succession and sends the mobile agent together with the new checksum further to the next server within the succession.

That means that when a server extends the initial path this initiator server can add all identities of the servers on the extension of the initial path to the secure data container. All servers in the extension of the initial path have to add their respective identities to the secure data container as well when the mobile agent visits this respective server. Because the owner of the mobile agent knows all servers in the initial part it can check when the mobile agent is back home if there are no data from the servers on the extension of the initial path that have been left out of the secure data container in a malicious way.

In one possible aspect, the sequence of checksums can be defined by the following functional rule:

$$C_i = \{C_{i-1}, [X_i, [r0]PKS_0]PKS_i, S_i\}KS_0 \qquad (22)$$

where $C_i$ is the $i^{th}$ checksum; $X_i$ is the data to be added at the $i^{th}$ server; r0 is the unique number; $PKS_0$ is the private key of the first server; $KS_0$ is the public key of the first server; $PKS_1$ is the private key of the $i^{th}$ server; $S_i$ is a code number of the $i^{th}$ server; and i is a positive integer value.

In another aspect, each checksum can be used to be deflated by the first server for verifying successively the respective keys on the data thus checking the orderly completion of the path when the mobile agent returns back to the first server.

In another aspect a system is provided, which includes at least an initiator server as one of a plurality of servers which a mobile agent has to pass according to a pre-given chronology which defines an initial path of the mobile agent. The initiator server can be configured when being reached by the mobile agent in the pre-given chronology to extend the initial path of the mobile agent by a second number of servers including the server following the initiator server according to the initial path thereby defining an extension of the initial path which can be a loop from the initiator server to the server following the initiator server according to the initial path. Thereby, the extension of the initial path and data intended for any one of the second number of servers can be jointly encrypted within a nested structure which is given the mobile agent to take with it. The nested structure can be built up of a number of nested terms corresponding to the second number of servers, each nested term being decryptable by exactly one server of the second number of servers in such a manner that each server of the second number of servers gets access only to the data intended for it and to a section of the path, respectively, when being reached by the mobile agent in the defined chronology of the extension of the initial path. The nested structure can be further signed by a signature of the initiator server of the extension of the initial path.

In a possible further aspect the initial path and data intended for any one of the initial number of servers which are to be passed on the initial path can be jointly encrypted within an initial nested structure. The initial nested structure can be built up of a number of nested terms corresponding to the initial number of servers. Each nested term can be decryptable by exactly one server of the initial number of servers in such a manner that each server of the initial number of servers gets access only to the data intended for it and to a section of the path, respectively, when being reached by the mobile agent in the chronology defined by the initial path.

Furthermore, it is possible that the nested term of the initial nested structure which is decryptable by the server following the initiator server according to the initial part can be integrated in the nested structure describing the extension of the initial path.

In a possible aspect, each of the nested terms to be decoded by the respective server, herein called the $i^{th}$ server $S_i$, for access to the respective data is defined according to the following scheme:

$$\text{Data}\_S_i = [r0, ip(S_{i-1}), ip(S_i), \{S_iKo\}KS_i, h(KS_I, S_iKo), \{m'_i\}S_iKo]PKS_I \qquad (23)$$

wherein i is a positive integer value; r0 is a unique number; $ip(S_i)$ and $ip(S_{i-1})$ are the respective ip-addresses of servers $S_i$ and $S_{i-1}$, respectively; $S_iKo$ is a secret key of the $i^{th}$ server; $KS_i$ is the $i^{th}$ server's public key; h is a wrapping function, $KS_I$ is the public key of a signing server; $PKS_I$ is the private key of the signing server; and $m'_i$ is the $i^{th}$ term of the nested terms which is defined as follows:

$$m'_i = m_i, ip(S_{i+1}), \text{Data}\_S_{i+1} \qquad (24)$$

where $ip(S_{i+1})$ is the respective ip-address of server $S_{i+1}$, and $m_i$ is the data intended for the $i^{th}$ server $S_i$, wherein the signing server is the initiator server with respect to the extension of the initial path and the first server with respect to the initial path.

It is possible that the unique number is used only once and is calculated on the basis of a program code of the mobile agent. The program code of the mobile agent can be maintained in a Java Archive file. Thereby, the Java Archive file can be signed, as already mentioned, by the first server's private key. Moreover, the Java Archive file can contain the unique number assigned to the mobile agent.

According to another implementation, the agent's program code and the data of the mobile agent can be serialized separately.

According to a further aspect the initiator server can be configured to receive the mobile agent that has been prepared by the first server by encoding a chosen unique number with the private key of the first server, thus forming an agent specific initialization number as the basis for a sequence of checksums to be computed successively by the number of servers, and sending the mobile agent together with its initialization number on its route passing thereby the number of servers successively, to encode, when being passed, the initialization number together with data which are to be added by the initiator server and which comprise at least all identities of the servers on the extension of the initial path with the initiator server's private key and to compute therewith a new server specific checksum using the public key of the first server and the checksum computed by the server right before in the succession, and to send the mobile agent further on the extension of the initial path passing thereby the second number of servers successively, so that each server of the second number of servers, when being passed by the mobile agent, encodes the initialization number together with the data which are to be added at that respective server and which comprise at least the identity of that respective server with that server private key and computes therewith a new service specific checksum using the public key of the first server and the checksum computed by the server right before the succession and sends the mobile agent together with the new checksum to the next server within the succession according to the extension of the initial path.

It is possible that the sequence of checksums is defined by the following functional rule:

$$C_i = \{C_{i-1}, [X_i, [r0]PKS_0]PKS_i, S_i\}KS_0 \quad (25)$$

where $C_i$ is the $i^{th}$ checksum; $X_i$ is the data to be added at the $i^{th}$ server; r0 is the unique number; $PKS_0$ is the private key of the first server; $KS_0$ is the public key of the first server; $PKS_i$ is the private key of the $i^{th}$ server; $S_i$ is a code number of the $i^{th}$ server; i is a positive integer value.

In another aspect, a computer program product is provided with a computer-readable medium and a computer program stored on the computer-readable medium with a program code which is suitable for carrying out a method for securely extending a path of a mobile agent from a first server as described before when the computer program is run on a computer.

Another implementation provides a computer program with a program code which is suitable for carrying out a method for securely extending a path of a mobile agent from a first server as described before when the computer program is run on a computer.

A computer-readable medium with a computer program stored thereon is also provided, the computer program comprising a program code which is suitable for carrying out a method for securely extending a path of a mobile agent from a first server as described before when the computer program is run on a computer.

Implementations can be used in an e-business scenario for travel management for example on top of a so-called SAP NetWeaver™ platform. When someone wants to plan a trip, he can first check the web pages of some airline companies for the price of a flight, to pick the cheapest one out. Besides that airplane ticket, one may also need to rent a car and book a hotel for the trip. In reality, most airline companies have special deals with hotels and car rental services. The check for the cheapest combination of an airplane ticket, hotel and car rental is very time-consuming for most people. By using a mobile agent, it is possible to automate this search. It is needed a mobile agent that carries the data of the trip with it and looks on the different agent-enabled SAP NetWeaver™ platforms for the needed information. Data that are sensitive for customers can now be protected even when one server wants to extend an initial path of a respective mobile agent. Data which are sensitive for customers can be for example credit card information, fidelity numbers, etc.

Further features and embodiments will become apparent from the description and the accompanying drawings.

For the purpose of clarity, the present discussion refers to an abstract example of a network system. However, implementations of the method and the system may operate with a wide variety of types of network systems including networks and communication systems dramatically different from the specific example as illustrated in the following drawings.

It should be understood that while details of one or more implementations are described in terms of a specific system, further implementations may have applications in a variety of communication systems, such as advanced cable-television systems, advanced telephone-networks or any other communication systems that would benefit from the system or the method. It is intended that the system as used in this specification and claims is realizable within any communication system unless the context requires otherwise.

Implementations are schematically illustrated in the drawings by way of an example embodiment and explained in detail with reference to the drawings. It is understood that the description is in no way limiting and is merely an illustration of various implementations.

It will be understood that the features mentioned above and those described hereinafter can be used not only in the combination specified but also in other combinations or on their own, without departing from the scope of the present disclosure.

The details of one or more implementations are set forth in the accompanying drawings and the description below. Other features will be apparent from the description and drawings, and from the claims.

DETAILED DESCRIPTION

Figure 1:
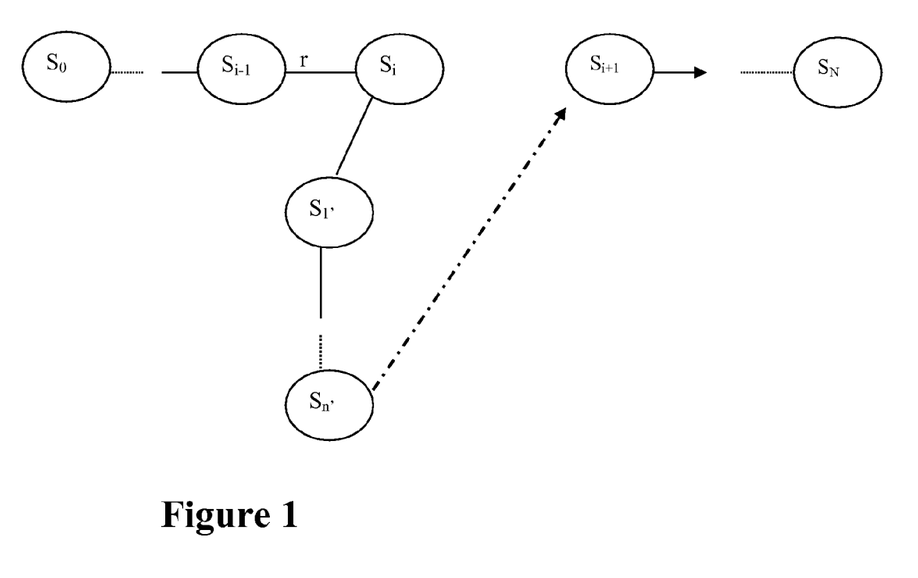
FIG. 1 shows a possible scheme for an extension of an initial path of a mobile agent.

FIG. 1 shows an embodiment of an extended path based on an initial path r of a mobile agent. A mobile agent from a first server $S_0$ within a network system of a plurality of servers $(S_1, S_2, \ldots, S_N)$ has to pass at least a first number of servers within the network system according to an appropriate succession defined by the initial path r. After passing all the initial servers and collecting the needed information the mobile agent generally returns back to the first server $S_0$.

An initiator server $S_i$ within the initial path r is able to securely extend the initial path r by adding a second number of servers $(S_j')$ with $j'=1', 2', \ldots, n'$ thus defining an extension of the initial path r. Therefore, server $S_i$ encrypts the extension of the initial path within a nested structure as prefix for the initial path r according the following functional rule:

$$r' = \{ip(S_i), ip(S_{2'}), [ip(S_i), ip(S_{1'}), ip(S_{2'}), t, \{\ldots\}KS_{2'}, r]PKS_i\}KS_{1'}, r$$

$$\{\ldots\}KS_{2'} = \{ip(S_{1'}), ip(S_{3'}), [ip(S_{1'}), ip(S_{2'}), ip(S_{3'}), t, \{\ldots\}KS_{3'}, r]PKS_i\}KS_{2'}$$

...

...

$$\{\ldots\}KS_{n-1'} = \{ip(S_{n-2'}), ip(S_{n'}), [ip(S_{n-2'}), ip(S_{n-1'}), ip(S_{n'}), t, \{\ldots\}KS_{n'}, r]PKS_i\}KS_{n-1'}$$

$$\{\ldots\}KS_{n'} = \{ip(S_{n-1'}), ip(S_{i+1}), [ip(S_{n-1'}), ip(S_{n'}), ip(S_{i+1}), t, \{\ldots\}KS_{i+1}, r] PKS_i\}KS_n$$

$$\{\ldots\}KS_{i+1} = \{ip(S_{n'}), End, [ip(S_{n'}), ip(S_{i+1}), End, t, r]PKS_i\}KS_{i+1}$$

The encrypted extension of the initial path has a nested structure, consisting of nested terms. The number of nested terms corresponds to the second number of servers $S_j'$ which are to be visited by the mobile agent on the extension of the initial path. The mobile agent MA starts the extension at the initiator server $S_i$. The server $S_i$ has a private key $PKS_i$ and a corresponding public key $KS_i$. Furthermore, the server $S_i$ has an ip-address $ip(S_i)$. Each server $S_j'$ of the second number of servers also has a private key $PKS_j'$, a corresponding public key $KS_j'$ and an ip-address $ip(S_j')$. t is a unique number. The next server $S_{i+1}$ of the initial path is set last server of the extension to return the mobile agent back on the initial path r to continue the initial path. The extension can describe a loop from the initiator $S_i$ to server $S_{i+1}$ as the last server of the extension as indicated in FIG. 1.

Therefore, the encrypted extension contains the encrypted ip-addresses of the respective servers that the mobile agent will visit on the extension. Thereby, the path determines a specific order according to which the servers are to be visited by the mobile agent. Moreover, the encrypted extension comprises digital signatures to protect the integrity of the extension of the mobile agent.

When the mobile agent MA arrives at a server $S_j'$, the encrypted path has already been partly decrypted by the servers $S_1', \ldots, S_{j-1}'$, which have already been visited by the mobile agent as determined by the path itself. Therefore, the term to be decrypted by server $S_j'$ can be described as follows:

$$\{ \ldots \}KS_j' = \{ip(S_{j-1}'), ip(S_{j+1}'), [ip(S_{j-1}'), ip(S_j'), ip(S_{j+1}'), t, \{\ldots\}KS_{j+1}', r]PKS_i\}KS_j'$$

Therefore, $S_j'$ can decrypt by means of its private key $PKS_j'$ the ip-address $ip(S_{j-1}')$ of its predecessor $S_{j-1}'$ and the ip-address $ip(S_{j+1}')$ of its successor $ip(S_{j+1}')$. Moreover, it can decrypt the digital signature, thus, getting to know the data structure $ip(S_{j-1}'), ip(S_j'), ip(S_{j+1}'), t, \{ \ldots \}KS_{j+1}'$, r. However, a remainder, namely $\{ \ldots \}KS_{j+1}'$, remains encrypted and becomes the new data structure of the path, i.e., of the remaining path.

The signatures are calculated based on the unique number t in order to prevent replay attacks. The signatures also contain the ip-address of the current server $S_j'$, the previous server $S_{j-1}'$ and the next server $S_{j+1}'$ of the extension. However, the next server $S_{i+1}$ of the initial path is set last server of the extension to return the mobile agent back on the initial path to continue the initial path without returning to initiator server $S_i$. Mostly, the mobile agent will return finally to the server $S_0$ where the mobile agent departed. The signatures are included in the encrypted part, to keep the extension secret.

Because of the nested encryption of the path the servers have to be visited in the right order. If the verification of the signature by server $S_j'$ is successful, $S_j'$ can be certain that it was included in the original extension, that the mobile agent MA comes from the correct predecessor $S_{j-1}'$, that the address of the following server $S_{j+1}'$ is correct and that all further data in the path cannot be changed.

In order to protect at least the extension of the initial path of the mobile agent, the principle of nested encryption is used. This approach is combined with a mechanism to protect data of the mobile agent as described in the following formula:

$$Data\_S_j' = [r_o, ip(S_{j-1}'), ip(S_j'), \{S_jKo'\}KS_j', h(KS_i, S_jKo'), \{m'_j\}S_jKo']PKS_i \text{ with: } m'_j = m_j, ip(S_{j+1}'), Data\_S_{j+1}'$$

The data of the extension and the data that are targeted to different servers on the extension of the initial path of the mobile agent are jointly encrypted within a nested structure which can be presented by the formula as shown. All data of the mobile agent as well as the extension of the initial path the mobile agent intends to trace are protected in one go. The ip-addresses used to describe the extension of the initial path and the data represented by $m_j'$ are coupled and appropriately encrypted. The same mechanism can be used to protect not only the extension of the initial path but the whole extended path.

When the mobile agent MA arrives at server $S_j'$, server $S_j'$ verifies first the private key of the initial server $S_i$, namely the signature from server $S_i$ on the whole data structure. Then server $S_j'$ decrypts the secret symmetric key $S_jKo'$ with its private key $PKS_j'$. Then server $S_j'$ checks the message authentication code, namely the hash value h of the public key $KS_i$ from server $S_i$ with the secret symmetric key $S_jKo'$. Finally server $S_j'$ decrypts the data $m'_j$ and makes it available to the mobile agent MA if appropriate. Thereby, the ip-address of the following server $S_{j+1}'$ as well as the data $m_j'$ which is targeted to server $S_j'$ gets available. From $Data\_S_{j+1}'$ which is also comprised within $m'_j$, server $S_j'$ gets no more information since $S_j'$ has no access to the secret key $S_{j+1}Ko'$. Therefore, server $S_j'$ cannot see the full path or all data of the mobile agent. The fact that no server on the extension of the mobile agent can see the full extension that the mobile agent should follow can be convenient with respect to privacy of information.

In order to prevent that server $S_j'$ can send information about the mobile agent to all servers that are cooperating with server $S_j'$ so that those servers can reset the mobile agent when the mobile agent arrives at one of these servers, the data can be added to the mobile agent in a secure way as proposed in the previous application with the application number 06 290 876.9. The introduction of a checksum can be used in order to guarantee that any undesirable intervention of a server can be detected. Such a checksum which has to be computed by each server $S_j$, the mobile agent visits on its extension and which is given to the mobile agent to take with it on its further route can be defined by the following functional rule:

$$C_{j'} = \{C_{j-1'}, [X_{j'}, [r0]PKS_0]PKS_{j'}, S_{j'}\}_{KS0}$$

wherein $C_{j'}$ is the $(j')^{th}$ checksum; $X_{j'}$ is the data from the $(j')^{th}$ server; r0 is the unique number; $PKS_0$ is the private key of the first server; $KS_0$ is the public key of the first server; $PKS_{j'}$ is the private key of the $(j')^{th}$ server; $S_{j'}$ is a code number of the $(j')^{th}$ server; j' is a positive integer value.

It can be envisaged that every time the mobile agent reaches a server $S_j'$, the server $S_j'$ has to add its identity at the least to the secure data container, even if no other data are collected at that server. This way it is possible to check when the mobile agent is back home which servers have been visited by the mobile agent on the extension.

Figure 2:
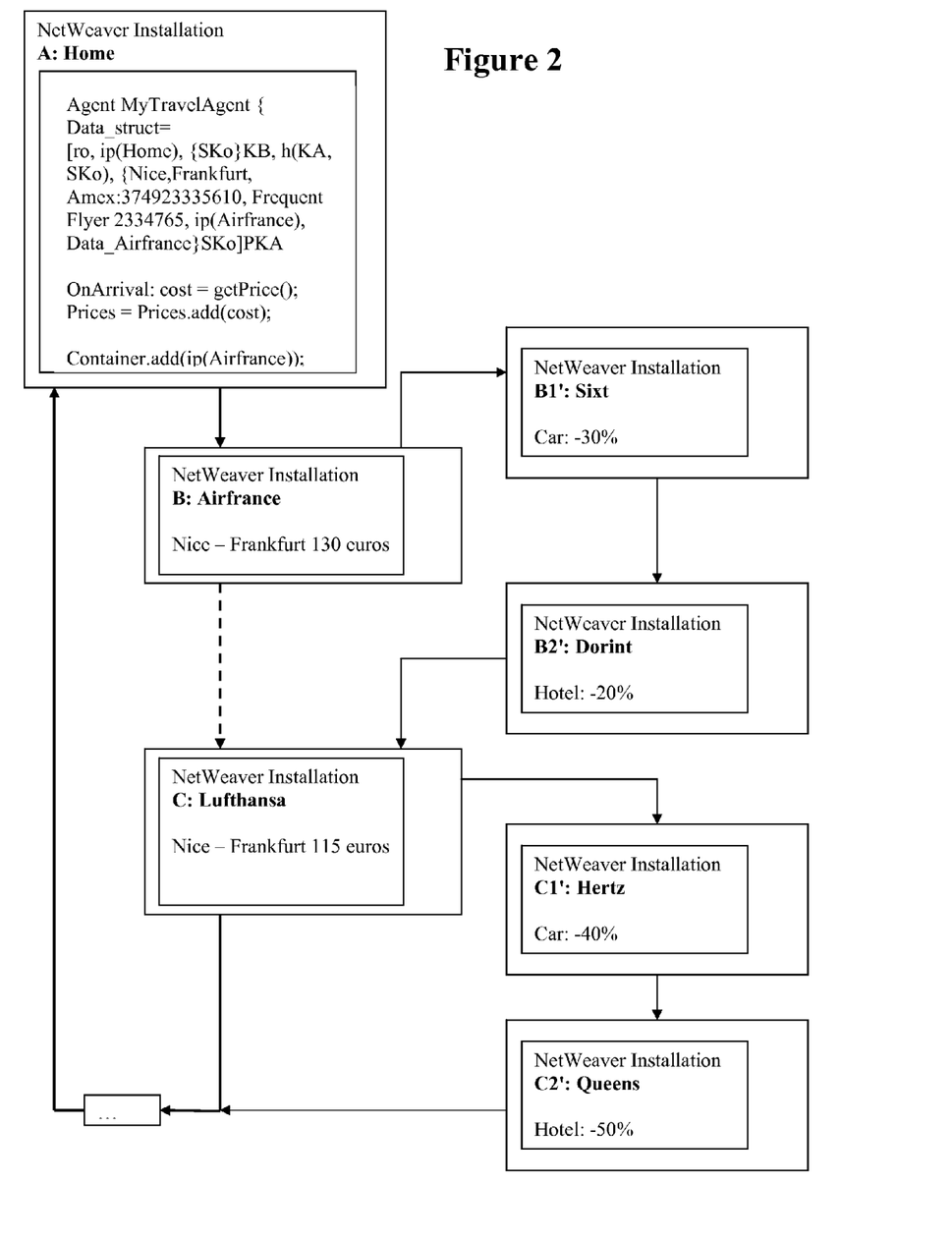
FIG. 2 shows an e-business scenario in which an extension of an initial path of a mobile agent can be realized.

FIG. 2 shows a specific e-business scenario for a travel management on top of a so-called SAP NetWeaver™ platform. It is assumed that someone wants to plan a trip. In this case he checks the web pages of some airline companies for the price of the flight he wants to do to pick out the cheapest one. In the case shown here the traveler constructs by means of server A as the Home server "Home" a mobile agent MA called here "MyTravelAgent." It is assumed that the initial path of the mobile agent consists of a first number of secure airline servers as marked by thick arrows in FIG. 2.

The mobile agent MA migrates now from one airline company server to another in order to get enough information for the trip to be planned by the traveler. Besides an airplane ticket the traveler would also need to rent a car and book a hotel for the trip. In reality most airline companies have special deals with partnership hotels and car rental services. The check for the cheapest combination of airplane ticket, hotel and car rental is too time consuming for most travelers.

By extending the initial path of the mobile agent the server of the airline company guides the mobile agent MA to the servers of the partnership hotels and car rental services. The extension is marked by thin arrows. It is assumed that the servers within the extension are not as secure as the airline servers of the initial path, therefore the extension has to be encrypted by the initiator server, in the present case by the respective server of the airline company.

So the encrypted data structure for the extension which is carried by the mobile agent MA corresponds here to:

Data_B1'={r0,ip(B),ip(B1') $\{S_{B1}.Ko\}KB1'$, h(KB, $S_{B1}.Ko$), {Nice, Frankfurt, Amex: 374923335610, Frequent Flyer 2334765,ip(B2'), Data_ B2'}$S_{B1}.Ko$}PKB wherein r0 is a unique number; and ip(B) is the ip-address of initiator server B.

In the case shown here, server B corresponds to the server of the airline Air France. ip(B1') is the ip-address of a server B1' which is the first server of the extension and corresponds to the server of the car rental service, Sixt. $S_{B1}.Ko$ is a secret symmetric key which is assigned to and known by server B1'. KB is a public key and PKB a private key of server B as initiator server. After collecting the needed information on the special deals, the mobile agent returns back on its initial path by migrating to the next server of the initial path.

The mobile agent MA looks now on its route through the network system on the different agent enabled SAP NetWeaver™ platforms for the needed information. The order of the servers which are to be visited by the mobile agent defines the initial path and the extension of the mobile agent which can be described by the respective ip-addresses of the servers. The data which is carried by the mobile agent MA and which should be not accessible to any server within the network is {Nice, Frankfurt, Amex: 374923335610, Frequent Flyer 2334765, ip(B2'), Data_B2'} since those data are sensitive for the traveler, particularly for example a credit card information and further fidelity numbers. This data can be partly decrypted by server B1'.

First, mobile agent MA is sent from server B to server B1'. In order to get information about the request of the traveler, server B1' has to handle the data element Data_B1' accordingly. First, server B1' can verify the digital signature of server B, namely the private key PKB by means of the public key KB. Then server B1' decrypts the secret symmetric key $S_{B1}.Ko$ with its private key PKB1'. By means of the secret symmetric key $S_{B1}.Ko$ server B1' can check the message authentication code, namely the hash value h of the public key KB of server B. Finally server B1' decrypts the data {Nice, Frankfurt, Amex: 374923335610, Frequent Flyer 2334765, ip(B2'), Data_B2'} by means of the secret symmetric key. Thereby, server B1' gets to know that the traveler wants to book a flight from Nice to Frankfurt, that his Amex number is 374923335610, and that the traveler is the frequent flyer 2334765. Moreover, due to the ip-address ip(B2'), server B1' gets to know the next server the mobile agent has to visit. Besides the information server B1' needs to give any further information about the request of the traveler, namely about the price reduction for the car, server B1' also gets to know the ip-address of the next server B2' to which the mobile agent is to be sent next. In the case shown here server B2' corresponds to the server of the Hotel Dorint. The rest of the path the mobile agent has to trace is included in the encrypted data element "Data_B2'." The data element Data_B2' is not further decryptable by server B1'. This element is structured comparably as the data element "Data_B1'" decryptable by server B1'. Therefore, regarding the whole path of the mobile agent, there results a nested data structure. Data_B2' is partly decryptable by server B2' so that server B2' gets information targeted to it in order to contribute in processing the request of the traveler.

From server B1' as the server of the car rental service Sixt, the traveler gets some information about a price reduction for a car of about −30%. For information about the hotel the server of the car rental service sends the mobile agent according to the extension to the server of the partnership hotel Dorint in order to get now the complete information for a trip when it is made by using the airline Air France and one of the partnership hotels and car rental services with which the airline company Air France has special deals. Within the extension the mobile agent MA migrates further to server C as the server of the airline company Lufthansa. The server of the airline company Lufthansa being the next server C of the initial path is set as last server of the extension for returning the mobile agent back to the initial path.

In order to get information about an alternative airline company, the mobile agent travels further on the initial path through the network to the server C of the airline company Lufthansa. On this server it gets information about the flight from Nice to Frankfurt which costs about 115 Euros. The Lufthansa company has a deal with the car rental service Hertz and with the hotel Queens. The server C of the airline company Lufthansa extends the initial path by adding a second extension with the ip-addresses of the servers of its partnership hotel and car rental service according the processing shown for server B. The mobile agent MA can now get more information on the respective servers of the car rental services and the hotels in order to get a complete statement of costs for the traveler when either using the airline company Air France or the airline company Lufthansa. The nested encryption of the second extension and the data is similar to the procedure of server B. In this case the initial path is assumed to be secure without a need for encryption. Finally, the mobile agent MA returns back to server A with a detailed catalogue of statements of costs about different alternatives for planning the trip from Nice to Frankfurt. In order to avoid that the mobile agent MA is vulnerable to so-called cut-and-paste attacks when the mobile agent MA migrates from one server to another its path as well as the data it carries with it, particularly the sensitive data of the traveler, as for example the credit card information and further fidelity numbers, are protected as proposed by term Data_B1' for the extension. Thus, no unauthorized server of the extension can get access to the sensitive data of the traveler. Furthermore, no server of the extension can see the full path that the mobile agent should follow. This can be quite convenient with respect to privacy of information.

In another possible case, as shown in FIG. 2, the entire extended path including the initial path and the extension is encrypted according to the nested encryption method as described beforehand in detail for the extension.

What is claimed is:

1. A method of securely extending an initial path of a mobile agent from a first server within a network system having a plurality of servers, at least an initial number of which the mobile agent must pass according to a pre-given chronology which defines the initial path of the mobile agent, the method comprising:
   extending the initial path of the mobile agent from an initiator server by a second number of servers of the plurality of servers, when the initiator server is reached by the mobile agent in the pre-given chronology, wherein the second number of servers includes the server following the initiator server according to the initial path thereby defining an extension of the initial path;
   jointly encrypting within a nested structure the extension of the initial path and data intended for any one of the second number of servers;
   giving the nested structure to the mobile agent to take with it, the nested structure being built up of a number of nested terms corresponding to the second number of servers, each nested term being decryptable by exactly one server of the second number of servers in such a manner that each server of the second number of servers gets access only to the data intended for it and to a section of the extended path, when being reached by the mobile agent in the defined chronology of the extension, the nested structure further including a signature of the initiator server of the extension.

2. The method according to claim 1, further comprising jointly encrypting the initial path and data intended for any one of the initial number of servers within an initial nested structure, the initial nested structure being built up of a number of nested terms corresponding to the initial number of servers, each nested term being decryptable by exactly one server of the initial number of servers in such a manner that each server of the initial number of servers gets access only to the data intended for it and to a section of the path, respectively, when being reached by the mobile agent in the chronology defined by the initial path.

3. The method according to claim 2, wherein the nested term of the initial nested structure which is decryptable by the server following the initiator server according to the initial path is integrated in the nested structure describing the extension.

4. The method according to claim 1, further comprising defined the nested term that is to be decoded by a respective server (the $i^{th}$ server) for access to the respective data according to the following scheme:

$$\text{Data\_}S_i = [r0, ip(S_{i-1}), \{S_iKo\}KS_i, h(KS_i, S_iKo), \{m'_i\}S_iKo]PKS_I$$

wherein r0 is a unique number that is assigned to the mobile agent, $S_iKo$ is a secret key of the $i^{th}$ server, $KS_i$, is the $i^{th}$ server's public key, h is a wrapping function, $KS_I$ is the public key of a signing server, $PKS_I$ is the private key of the signing server and $m'_I$ is the $i^{th}$ term of the nested terms which is defined as follows:

$$m'_i = m_i, ip(S_{i+1}), \text{Data }_{13} S_{i+1}$$

wherein i is a positive integer value, $m_i$, is the data intended for the $i^{th}$ server $S_i$, wherein the signing server is the initiator server with respect to the extension and the first server with respect to the initial path.

5. The method according to claim 4, wherein the unique number (r0) is used only once and is calculated on the basis of a program code (PA) of the mobile agent (MA).

6. The method according to claim 5, wherein the program code (PA) of the mobile agent (MA) is maintained in a Java Archive file (JAR).

7. The method according to claim 6, wherein the Java Archive file (JAR) is signed by the first server's private key ($PKS_0$).

8. The method according to claim 6, wherein the Java Archive file (JAR) contains the unique number (r0) assigned to the mobile agent (MA).

9. The method according to claim 5, wherein the agent's program code (PA) and the data of the agent are serialized separately.

10. The method according to claim 1, wherein each of the plurality of servers has a pair of a public key ($KS_0, \ldots, KS_i, \ldots, KS_n$) and a private key ($PKS_0, \ldots, PKS_i, \ldots, PKS_n$) associated therewith, respectively, the method further comprising:
   receiving the mobile agent which has been prepared by the first server ($S_0$) at the initiator server by choosing a unique number (r0) and assigning it to the mobile agent, encoding the chosen unique number (r0) with the private key ($PKS_0$) of the first server ($S_0$), thus forming an agent specific initialization number ($C_0$) as basis for a sequence of checksums ($C_0, \ldots, C_i, \ldots, C_n$) to be computed successively by the number of servers ($S_0, S_1, \ldots, S_n$) to be passed by the mobile agent, and sending the mobile agent together with its initialization number ($C_0$) on its route through the network system for processing an order passing thereby the number of servers ($S_0, S_1, \ldots, S_n$) successively;
   encoding at the initiator server the initialization number ($C_0$) together with data ($X_i$) which are to be added by the initiator server and which comprise at least all identities of the servers on the extension with the initiator server's private key ($PKS_i$) and computing therewith a new server specific checksum ($C_i$) using the public key ($KS_0$) of the first server ($S_0$) and the checksum ($C_{i-1}$) computed by the server ($S_{i-1}$) right before in the succession; and sending the mobile agent further on the extension passing thereby the second number of servers successively, so that each server of the second number of servers when being passed by the mobile agent encodes the initialization number ($C_0$) together with data which are to be added at that respective server and which comprise at least the identity of that respective server with that server's private key and computes therewith a new server specific checksum using the public key ($KS_0$) of the first server ($S_0$) and the checksum computed by the server right before in the succession, and sends the mobile agent together with the new checksum further to the next server within the succession.

11. The method according to claim 10, wherein the data to be added at any of the servers are encoded by the public key ($KS_0$) of the first server ($S_0$).

12. The method according to claim 10, wherein the data the mobile agent gathers on its route through the network when processing the order are collected within a secure data container.

13. The method according to claim 10, wherein the sequence of checksums is defined as $$C_i = \{C_{i-1}, [X_{i31\ 1}, [r0]PKS_0]PKS_i, S_i\}KS_0$$

wherein $C_i$ is the $i^{th}$ checksum, $X_i$ is the data to be added at the $i^{th}$ server, r0 is the unique number, $PKS_0$ is the private key of the first server, $KS_0$ is the public key of the first server, $PKS_i$ is the private key of the $i^{th}$ server, $S_i$ is a code number of the $i^{th}$ server, i is a positive integer value.

14. The method according to claim 10, further comprising deflating each checksum ($C_i$) by the first server for verifying successively the respective keys on the data thus checking the orderly completion of the path when the mobile agent returns back to the first server ($S_0$).

15. A system comprising:
a mobile agent;
a plurality of servers that the mobile agent must pass according to a pre-given chronology that defines an initial path of the mobile agent; and
an initiator server, selected from the plurality of servers, and configured such that when the initiator server is reached by the mobile agent in the pre-given chronology it extends the initial path of the mobile agent by a second number of servers, including a server following the initiator server according to the initial path, thereby defining an extension of the initial path,
wherein the mobile agent carries the extended path and data intended for any one of the second number of servers and wherein the extended path and the data are jointly encrypted within a nested structure, the nested structure being built up of a number of nested terms corresponding to the second number of servers, each nested term being decryptable by exactly one server of the second number of servers in such a manner that each server of the second number of servers gets access only to the data intended for it and to a section of the path, when being reached by the mobile agent in the defined chronology of the extension, the nested structure further being signed by a signature of the initiator server of the extension.

16. The system according to claim 15, wherein the initial path and data intended for any one of an initial number of servers which are to be passed on the initial path are jointly encrypted within an initial nested structure, the initial nested structure being built up of a number of nested terms corresponding to the initial number of servers, each nested term being decryptable by exactly one server of the initial number of servers in such a manner that each server of the initial number of servers gets access only to the data intended for it and to a section of the path, respectively, when being reached by the mobile agent in the chronology defined by the initial path.

17. The system according to claim 16, wherein the nested term of the initial nested structure which is decryptable by the server following the initiator server according to the initial path is integrated in the nested structure describing the extension.

18. The system according to claim 15, wherein the nested term which is to be decoded by a respective server (the $i^{th}$ server $S_i$) for access to the respective data is defined according to the following scheme:

$$\text{Data}_{13}\ S_i = [r0, ip(S_{i31\ 1}), ip(S_i, \{S_iKo\}KS_i, h(KS_I, S_iKo), \{m'_i\}S_iKo]PKS_I$$

wherein i is a positive integer value, r0 is a unique number, $ip(S_i)$ and $ip(S_{i-1})$ are the respective ip-addresses of servers $S_i$ and $S_{i-1}$, respectively, $S_iKo$ is a secret key of the $i^{th}$ server, $KS_i$ is the $i^{th}$ server's public key, h is a wrapping function, $KS_I$ is the public key of a signing server, $PKS_I$ is the private key of the signing server and $m'_i$ is the $i^{th}$ term of the nested terms which is defined as follows:

$$m'_i = m_i, ip(S_{i+i}), \text{Data} - S_{i+1}$$

wherein $ip(S_{i+1})$ is the respective ip-address of server $S_{i+1}$, and $m_i$ is the data intended for the $i^{th}$ server $S_i$, wherein the signing server is the initiator server with respect to the extension and the first server with respect to the initial path.

19. The system according to claim 18, wherein the unique number (r0) is used only once and is calculated on basis of a program code (PA) of the mobile agent (MA).

20. The system according to claim 19, wherein the program code (PA) of the mobile agent (MA) is maintained in a Java Archive file (JAR).

21. The system according to claim 20, wherein the Java Archive file (JAR) is signed by the first server's private key (PKA).

22. The system according to claim 20, wherein the Java Archive file (JAR) contains the unique number (r0) assigned to the mobile agent (MA).

23. The system according to claim 19, wherein the agent's program code (PA) and the data of the mobile agent (MA) are serialized separately.

24. The network system according to claim 15, wherein the at least one initiator server of the plurality of servers ($S_0, S_1, \ldots, S_n$) is configured to receive the mobile agent which has been prepared by the first server by encoding the chosen unique number (r0) with the private key ($PKS_0$) of the first server ($S_0$), thus forming an agent specific initialization number ($C_0$) as basis for a sequence of checksums ($C_0, \ldots, C_i, \ldots, C_n$) to be computed successively by the number of servers ($S_0, S_1, \ldots, S_n$) to be passed by the mobile agent, and sending the mobile agent together with its initialization number ($C_0$) on its route passing thereby the number of servers ($S_0, S_1, \ldots, S_n$) successively, to encode when being passed the initialization number ($C_0$) together with data ($X_i$) which are to be added by the initiator server and which comprise at least all identities of the servers on the extension with said server's private key ($PKS_i$) and to compute therewith a new server specific checksum ($C_i$) using the public key ($KS_0$) of the first server ($S_0$) and the checksum ($C_{i-1}$) computed by the server right before in the succession, and to send the mobile agent further to the next server on the extension passing thereby the second number of servers successively, for that each server of the second number of servers when being passed by the mobile agent encodes the initialization number ($C_0$) together with data which are to be added at that respective server and which comprise at least the identity of that respective server with that server's private key and computes therewith a new server specific checksum using the public key ($KS_0$) of the first server ($S_0$) and the checksum computed by the server right before in the succession, and sends the mobile agent together with the new checksum further to the next server within the succession.

25. The system according to claim 24, wherein the sequence of checksums is defined as:

$$C_i = \{C_{i-1}, [X_i, r0]PKS_0]PKS_i, S_i\}KS_0$$

wherein $C_i$ is the $i^{th}$ checksum, X is the data to be added at the $i^{th}$ server, r0 is the unique number, $PKS_0$ is the private key of the first server, $KS_0$ is the public key of the first server, $PKS_i$ is the private key of the $i^{th}$ server, $S_i$ is a code number of the $i^{th}$ server, i is a positive integer value.

26. A computer program stored on a non-transitory computer-readable medium with a program code that when executed on a computer enables the computer to securely extend an initial path of a mobile agent from a first server within a network system having a plurality of servers, at least an initial number of which the mobile agent must pass according to a pre-given chronology which defines the initial path of the mobile agent, by:

extending the initial path of the mobile agent from an initiator server by a second number of servers of the plurality of servers, when the initiator server is reached by the mobile agent in the pre-given chronology, wherein the second number of servers includes the server following the initiator server according to the initial path thereby defining an extension of the initial path;

encrypting within a nested structure the extension of the initial path and data intended for any one of the second number of servers;

giving the nested structure to the mobile agent to take with it, the nested structure being built up of a number of nested terms corresponding to the second number of servers, each nested term being decryptable by exactly one server of the second number of servers in such a manner that each server of the second number of servers gets access only to the data intended for it and to a section of the extended path, when being reached by the mobile agent in the defined chronology of the extension, the nested structure further including a signature of the initiator server of the extension.

* * * * *